April 11, 1944.  R. M. HEINTZ  2,346,432
TORSIONAL VIBRATION DAMPER
Filed Nov. 10, 1942
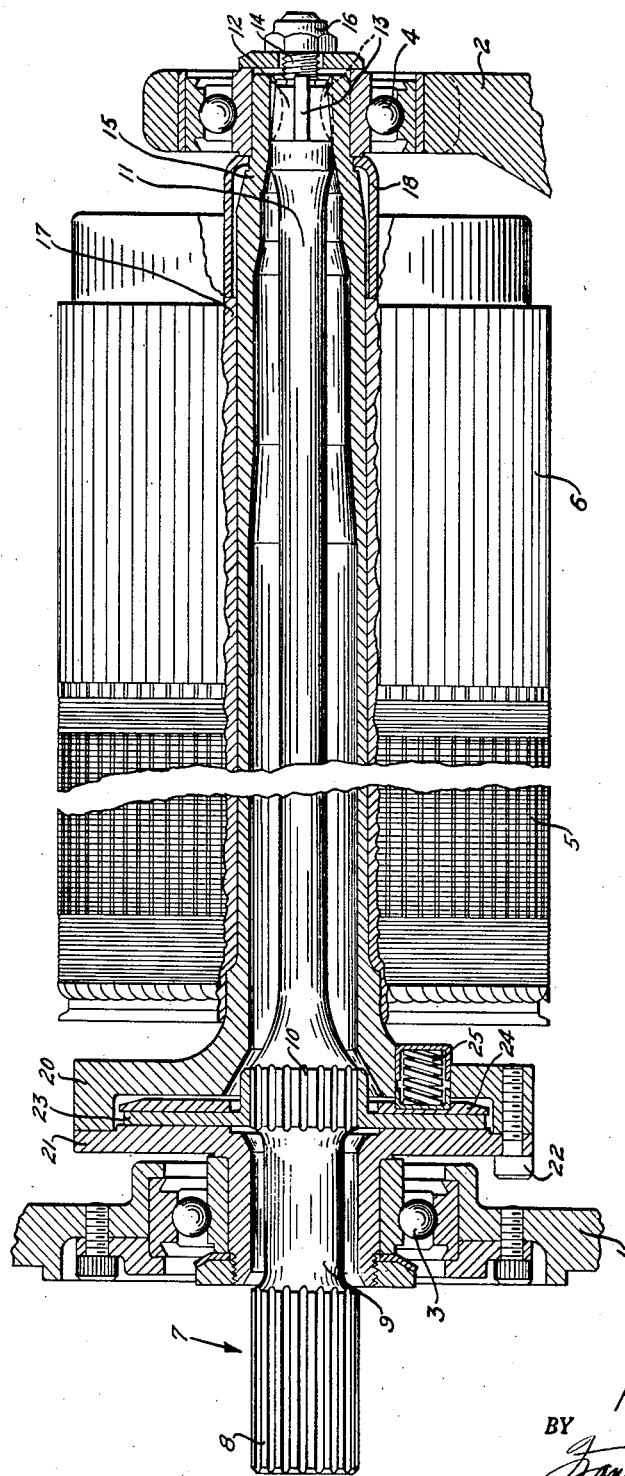
INVENTOR.
RALPH M. HEINTZ
BY
Frank L. Harmon
ATTORNEY Patented Apr. 11, 1944

2,346,432

UNITED STATES PATENT OFFICE 2,346,432

TORSIONAL VIBRATION DAMPER

Ralph M. Heintz, Cleveland, Ohio, assignor to Jack & Heintz, Inc., Bedford, Ohio, a corporation of Ohio Application November 10, 1942, Serial No. 465,110

2 Claims. (Cl. 64—1)

This invention relates to a torsional vibration damper for rotating machines and the like.

Machines and accessory devices driven from a pulsating power source such as an internal combustion engine are subjected to torsional stresses far in excess of the calculated load stress arising from the delivery of useful power, because of variations in angular velocity resulting from an uneven flow of power. An object of the present invention is to provide a driving arrangement which will prevent the transmission of vibratory torsional stresses to a machine or apparatus being driven, and a particular object is to provide an improved torsional vibration damper for rotating bodies.

A further object is to provide means for absorbing and dissipating increments of torsional vibration energy input to prevent the building up of torsional vibration in a rotating body.

The principles of the invention are illustrated in connection with an aircraft generator adapted to be driven by an aircraft power plant.

The figure in the drawing is an elevational view of an aircraft generator armature with parts broken away to reveal the construction of the vibration damper in section.

The numerals 1 and 2 designate bearing supports for armature bearings 3 and 4 in the generator housing, the field structure being omitted as immaterial to the invention. The armature comprises the usual laminated and slotted core 5, and commutator 6. A drive shaft 7 has a splined driving end 8, a neck 9, a splined portion 10, an elongated and reduced quill 11, and a tapered end portion 12 having key ways for keys 13, and a threaded tip 14. A stiff tube 15 surrounds the shaft 7 and is keyed by said keys to the tapered end 12, the tube and shaft being held together in the relationship shown by means of a nut 16, and the combination being carried in the bearing 4 as shown. In the present embodiment the core 5 and commutator 6 are mounted on a sleeve 17 which may be pressed on the tube 15, but these parts may be carried directly by the tube 15 if desired. A thimble or short sleeve 18 may be employed to position and retain the sleeve 17 on the tube 15.

The tube 15 is provided with a flanged end 20 united with a hollow flanged journal 21 by means of screws 22, the hollow journal 21 being carried in the bearing 3. From a structural standpoint the hollow journal 21 may be considered as part of the tube 15. A friction plate 23 is mounted for axial movement on the splined portion 10, this plate being in frictional engagement with the inner surface of the flanged journal 21 and a ring 24. A plurality of springs 25 are carried by the flanged end 20 to support the ring 24 and urge it against the friction plate 23 which is in turn brought to bear against the said inner surface of the flanged journal 21. It is noted that the parts herein described support the splined end 8 of the shaft 7 rather loosely in what might be called a floating support to allow the end 8 to accommodate itself to some degree to relative misalignment of the power take off shaft on the engine, or prime mover, after the manner of a universal joint. It is noted that the neck portion 9 is spaced within the journal 21 so as to receive no support or guidance therefrom, lateral movement of the shaft end 8 being subject to the restraint imposed by the frictional engagement between parts 21 and 23.

When the armature is driven by a prime mover developing an uneven power flow, such as an internal combustion engine, the power impulses produce forced torsional vibrations in the splined end 8 of the shaft 7. Taking into consideration the rotational moment of inertia of the mass of the core 5 and commutator 6 carried by the relatively stiff tube 15, the quill portion 11 is designed as a resilient torsional spring to absorb the input energy and displacement of the forced vibrations. As the inertia of the rotating mass resists any change in angular velocity the vibratory accelerations and decelerations imposed upon the driving end 8 produce torsional deflections in the quill 11 so that at the end 12 there are no vibratory forces of a magnitude sufficient to materially influence the rotating mass. The mass of the armature is thereby enabled to rotate at a steady speed substantially unaffected by the power impulses of the prime mover so that the structure as a whole is protected from torsional vibration stresses.

When the frequency of the power impulses falls into resonance with a natural frequency of torsional vibration of the armature additional means must be provided to prevent a large amplitude resonant vibration of the armature. Under such conditions the friction plate 23 absorbs and dissipates sufficient energy to prevent the building up of resonant vibrations, since a phase difference would tend to exist between the vibrations in shaft end 8 and those in the flange end 20 of the stiff tube 15. While the frictional drag of the plate 23 is sufficient to damp out torsional and lateral vibrations, it is not sufficient however to be effective in transmitting forced vibrations directly from the shaft end 8 and plate 23 to the armature.

While the principles of the invention have been described in connection with an aircraft generator for purposes of illustration, it is to be distinctly understood that they are equally applicable to protect any revolving mass from forced torsional vibrations. The invention is of particular advantage in driving accessory devices generally on internal combustion engines, and may also be embodied in motors or other prime movers connected with variable or pulsating loads.

I claim:

1. In a machine adapted to be rigidly mounted on and driven from a pulsating power source, a rotor rigidly mounted on a stiff tube, end bearings for said tube supporting said rotor in said machine, a resilient drive shaft in said tube, one end of said shaft being connected with one end of said tube and the other end of said shaft extending from the other end of said tube for external driving connection, a friction plate rigidly secured to said tube adjacent said other end thereof, a friction plate mounted on said shaft so as to assume the torsional and lateral vibrations thereof, and means to maintain frictional engagement between said plates to dampen said vibrations, said extending end of said shaft having torsional and lateral freedom of vibration under the restraint of said damping action.

2. In a machine adapted to be rigidly mounted on and driven from a pulsating power source, a pair of bearings, a stiff tube mounted in said bearings, a rotor for said machine built up around said tube, a resilient drive shaft in said tube, one end of said shaft being connected with one end of said tube and the other end of said shaft extending from the other end of said tube for external driving connection, a hollow flange on said tube between said bearings having a friction surface therein, a friction plate within said flange, said plate having a sliding splined connection with said shaft for longitudinal movement thereon and having radial clearance within said flange to allow lateral movements of said shaft within said tube, and spring means associated with said flange to maintain frictional engagement between said plate and said frictional surface, said arrangement serving to dampen torsional vibration and to accommodate misalignment of said rotor bearings and said driving connection.

RALPH M. HEINTZ.